No. 853,601. PATENTED MAY 14, 1907.
E. G. SCHREIBER.
POTATO DIGGING MACHINE.
APPLICATION FILED DEC. 11, 1906.
3 SHEETS—SHEET 3.
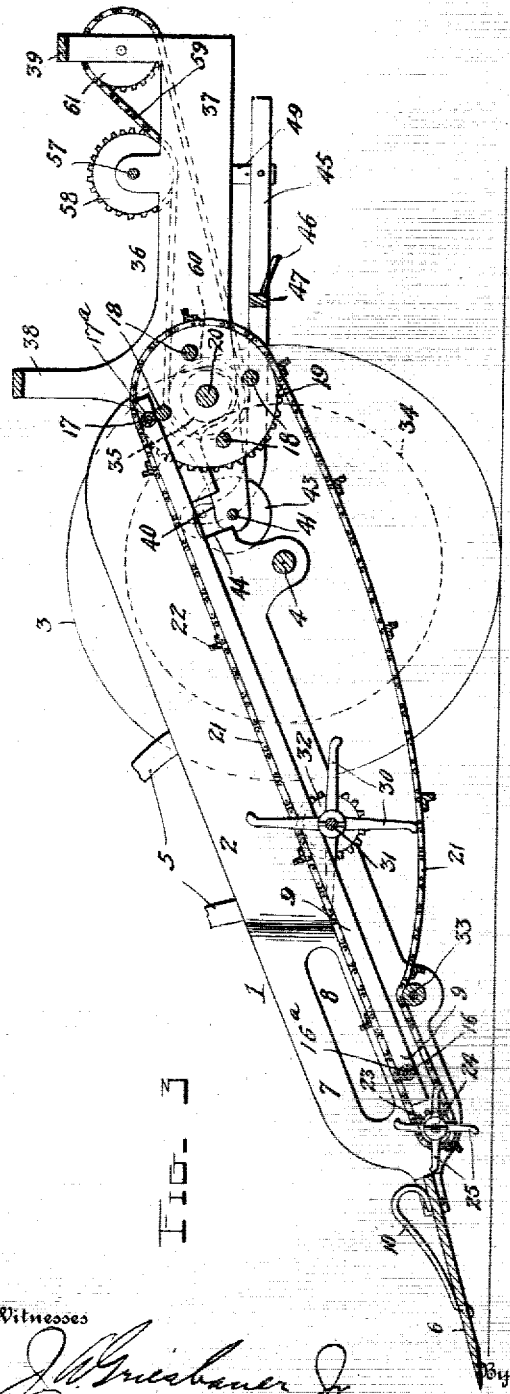
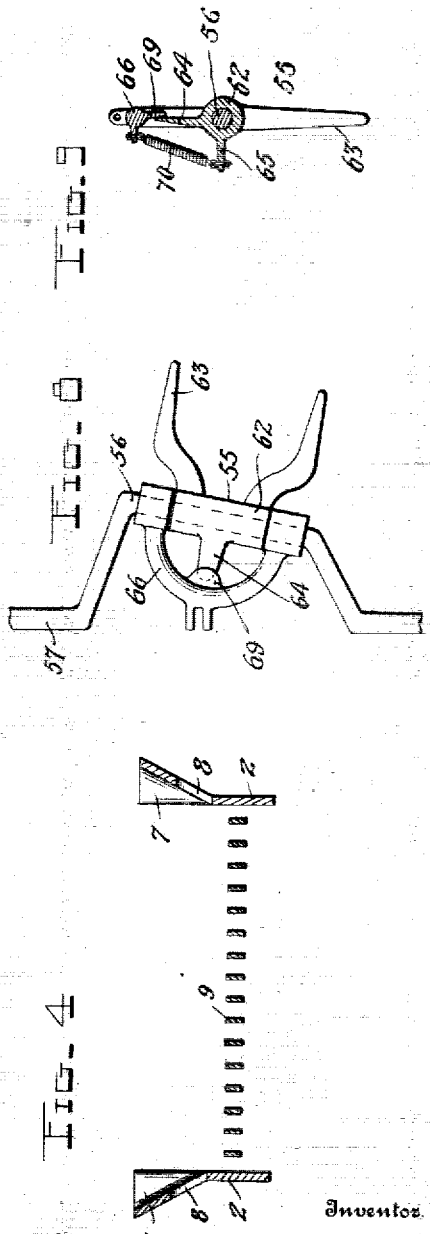
Witnesses
J. W. Griesbauer Jr.
H. L. Weaver
Inventor
Ernst G. Schreiber
By Watson E. Coleman
Attorney

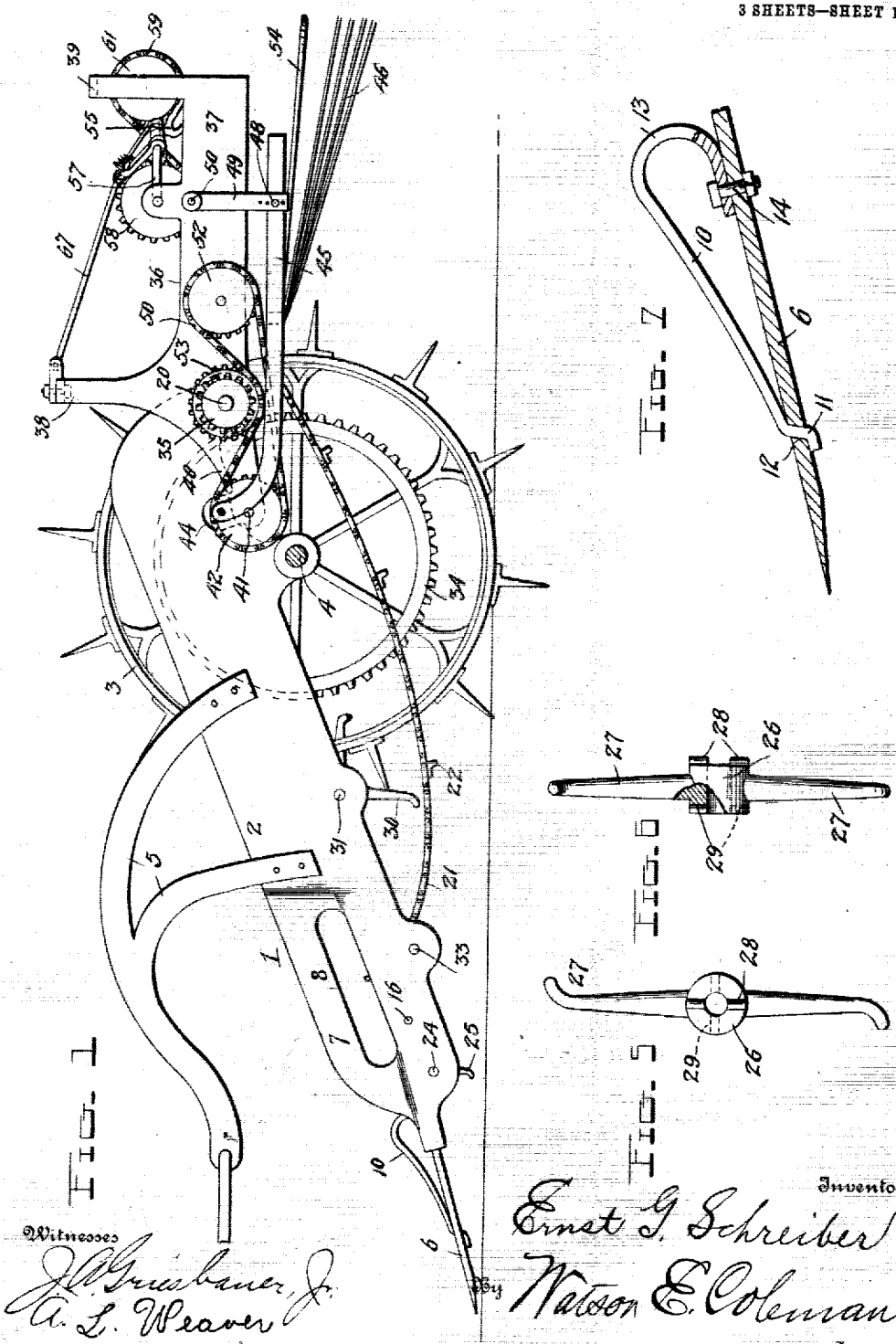

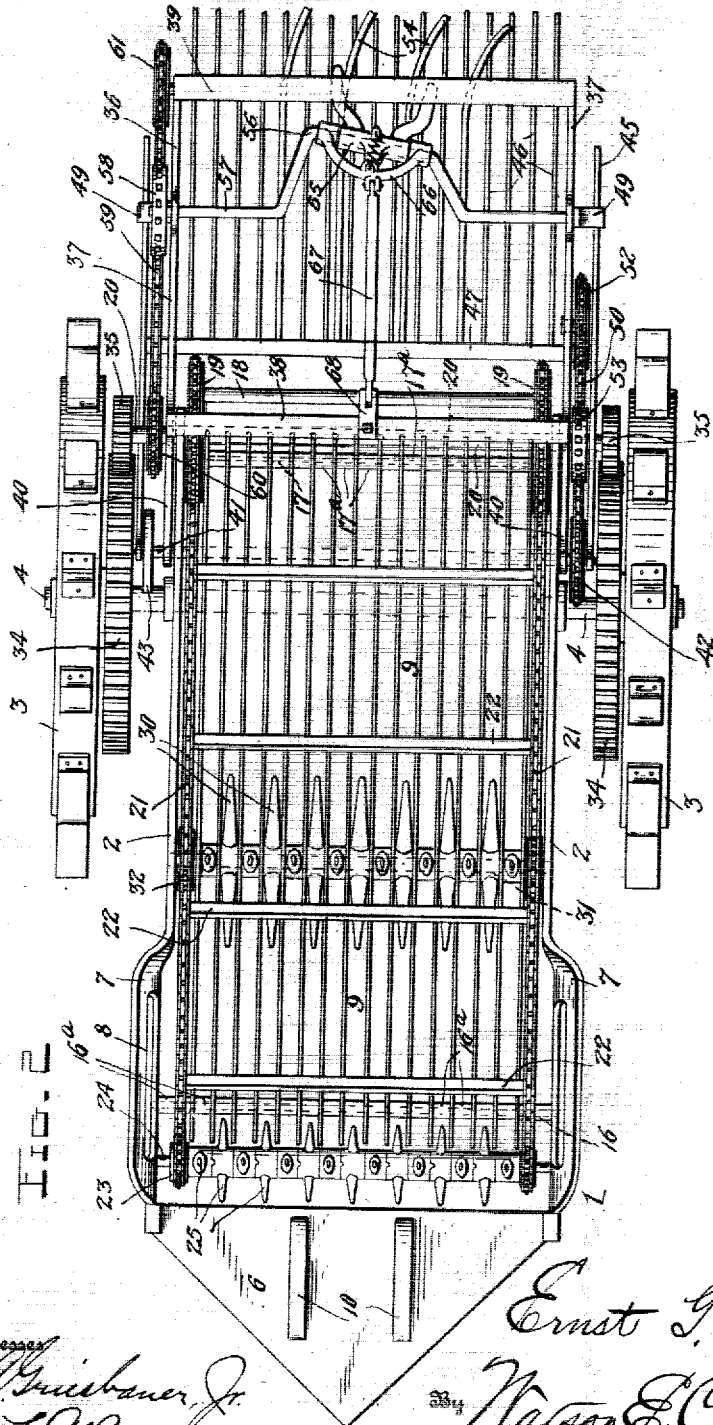

UNITED STATES PATENT OFFICE.

ERNST G. SCHREIBER, OF HAMMOND, INDIANA.

POTATO-DIGGING MACHINE.

No. 853,601.      Specification of Letters Patent.      Patented May 14, 1907.

Application filed December 11, 1906. Serial No. 347,325.

*To all whom it may concern:*

Be it known that I, ERNST G. SCHREIBER, a citizen of the United States, residing at Hammond, in the county of Lake and State of Indiana, have invented certain new and useful Improvements in Potato-Digging Machines, of which the following is a specification, reference being had therein to the accompanying drawing.

My invention relates to improvements in combined potato diggers and separators, and consists in the novel construction, combination and arrangement of parts hereinafter described and claimed.

The object of the invention is to improve and simplify the construction and operation of machines of this character and thereby render the same more efficient and durable and less expensive.

The above and other objects which will appear as the nature of the invention is better understood, are accomplished by the construction illustrated in the accompanying drawings, in which, Figure 1 is a side elevation of my improved machine, the left-hand supporting and drive wheel and its gear being omitted, the supporting truck for the front end of the machine and the draft tongue being also omitted; Fig. 2 is a top plan view of the improved machine, with parts omitted to more clearly illustrate the improved construction; Fig. 3 is a detail vertical longitudinal section; Fig. 4 is a detail vertical transverse section through the lower and forward end of the machine; Figs. 5 and 6 are views of one of the rotary agitators; Fig. 7 is a detail section through the shovel and one of its earth-breaking ribs; and Figs. 8 and 9 are detail views of the rake or kicking device mounted above the separator.

My improved machine comprises a main frame 1 inclined downwardly and forwardly and consisting of side plates 2. The rear of the frame is supported by supporting and drive wheels 3 mounted upon the ends of an axle 4 arranged in bearings upon the side plates 2. The forward end of the frame may be adjustably supported in any suitable manner, but I preferably attach to the side plates forwardly extending arms 5 to which is connected a wheeled truck (not shown) provided with a draft tongue. Suitable adjustable means (not shown) are provided between the arms 5 and the truck for raising and lowering the shovel 6 which is secured to and unites the front ends of the side plates 2.

The side plates 2 have their lower forward ends formed with laterally offset portions 7 for the purpose of increasing the width of the forward end of the frame. The offset portions 7 are flared outwardly, as clearly shown in Figs. 1 and 4, and are formed with longitudinally extending openings 8 which permit of the escape of earth thrown by the shovel 6 upon the slatted bottom or rack 9 of the frame 1. The increase in the width of the front end of the frame also provides more space upon each side of the rack 9 for the discharge of the earth.

In order to break up the earth passing over the shovel 6, I preferably provide upon the top of the latter two or more ribs 10, here shown in the form of straps of metal having their front ends formed with offset or bent portions 11 inserted in slots 12 in the shovel and their rear ends bent to form semi-circular loops 13 which are bolted, as shown at 14, upon the rear or upper portion of the shovel, as will be readily seen upon reference to Fig. 7. These ribs 10 break up the earth and deposit it in small pieces upon the rack 9. The rack 9 consists of a plurality of flat bars or slats arranged in parallel relation between the side plates of the frame and with their flat faces disposed vertically. Adjacent to their upper and lower ends are formed transversely alining apertures through the lower set of which is passed a transverse pivot rod or shaft 16 which has its projecting ends suitably secured in the side plates 2. The slats 9 swing freely from the pivot 16 and they are spaced apart by cylindrical sleeves 16ᵃ arranged upon said rod or pivot between them and between the outermost ones and the inner faces of the sides, 2, as clearly shown in Figs. 2 and 3. A securing rod 17 is passed through the alining apertures in the upper ends of the slats 9 but said rod simply serves to rigidly connect the slats and has no connection with the side plates. Upon the connecting rod 17 are arranged cylindrical spacing sleeves 17ᵃ which are similar to the sleeves 16ᵃ. The upper or rear ends of the slats or bars 9 are adapted to be successively engaged by a series of agitator bars 18 (preferably four in number) arranged between two sprocket wheels 19 on a main drive shaft 20 mounted in suitable bearings upon the upper, rear ends of the side plates 2. The upper end of the rack is supported by the bars 18 and as the shaft 20 revolves, the upper end of the rack is elevated successively by each bar 18 until it drops from the same and upon the next succeeding one, thus the rack is oscillated or shaken to cause the earth upon it to fall between its bars or slats.

The sprocket wheels 19 are the driving wheels for an endless carrier which travels over the rack 9 and elevates the earth, potatoes and vines thereon. This endless carrier consists of two sprocket chains 21 connected at suitable intervals by angle-metal, cross bars 22. The chains 21 are arranged upon each side of the rack 9 and pass over small sprocket wheels 23 fixed upon a transverse shaft 24 suitably mounted in the offset portions 7 of the side plates. The shaft 24 is arranged between the rear edge of the shovel and the lower ends of the slats 9 and upon its intermediate portion are arranged a plurality of agitators 25 which serve to break up the earth and lift it from the shovel onto the rack. Each of the agitators, as clearly shown in Figs. 5 and 6 comprises a hub 26 from which radiate two oppositely projecting arms 27 having curved, outer ends. One end of each hub 26 has ribs 28 to enter grooves 29 formed in the opposing end of the next adjacent hub so that the agitators will be maintained in their relative positions. As shown, the ribs and grooves on the hubs are so arranged that the arms 27 on adjacent hubs are in planes at right-angles to each other, but if desired, all of the arms on the hubs may be in the same plane. The hubs 26 are keyed or otherwise secured to the shaft 27 so as to rotate therewith. Similar agitating devices 30 are mounted upon a transverse shaft 31 located beneath the rack at a point approximately midway its length and journaled in suitable bearings upon the side plates 2. One of the agitators 30 is arranged between each two of the slats or bars of the rack 9 and they are caused to rotate by providing upon the shaft 31 sprocket wheels 32 which mesh with the upper stretches of the elevator chains 21. It will be noted that as the elevator chains travel upwardly through the frame of the machine their cross bars 22 will carry the earth and potatoes upwardly over the slats 9 and will pass between the elevator arms which rotate between the slats. These arms are adapted to project a considerable distance beyond or above the slats and the elevator chains so that their curved outer ends will effectively break up the earth between the cross bars of the elevator. The lower stretches of the latter pass over a guide roller arranged upon a transversely extending shaft 33 mounted in suitable bearings in the offset portions 7 of the side plates 2. Each of the supporting and driving wheels 3 carries a gear 34 which meshes with a pinion 35 upon one end of the shaft 20. Thus when the machine is drawn forwardly the rack 9 is oscillated or shaken, the elevator is set in motion and the agitators 25 and 30 are also rotated.

Pivotally mounted at the rear of the machine upon the main shaft 20 is a separator frame 36 consisting of two side plates 37 united by front and rear, arched portions 38, 39. The side plates 37 are pivoted upon the shaft 20 and have forwardly extending arms 40 in which is journaled a transverse shaft 41 carrying at one end a sprocket wheel 42 and at its opposite end a crank disk 43. Suitable slots 44 are formed in the bottom edges of the side plates 2 to receive the shaft 41 when the frame 36 is lowered. No adjusting means for the frame 36 is shown, but I preferably employ such as is shown in the patent granted to Hoover, May 8th, 1882, Number 382,363. Provided upon the sprocket wheel 42 and the disk 43 are wrist pins to which are pivoted the upwardly curved forward ends of the side bars 45 of a screen 46. The latter consists of a plurality of parallel rods connected at their forward ends to a cross bar 47 which connects the side bars 45. The rear ends of the bars 45 are adjustably connected, as at 48, to the lower ends of hangers 49 pivoted at 50 upon the side plates 37 of the frame 36. By thus mounting the screen, it will be seen that it will be oscillated or shaken when the shaft 41 is rotated. The sprocket wheel 42 on the shaft 41 is engaged by a sprocket chain 51 which also passes around an idle sprocket wheel 52 mounted upon one of the side plates 37 and has its upper stretch engaged with a sprocket wheel 53 fixed upon one end of the main drive shaft 20. The motion of the latter is thus imparted to the shaft 41.

The screen 46 separates the earth from the potatoes and in order to separate the vines from the potatoes, a second screen 54 is arranged above the screen 46 and consists of rods having their forward ends connected to the cross bar 47 and their rear ends curved laterally or to one side, as shown in Fig. 2. Co-acting with the screen 54 is a rake 55 arranged upon an angularly-disposed crank portion 56 of a shaft 57. The latter is mounted in suitable bearings upon the side plates 37 and has upon one of its ends a sprocket wheel 58 which meshes with the upper stretch of a sprocket chain 59 passing over a sprocket wheel 60 upon the main drive shaft 20, and also over an idle sprocket wheel 61 mounted upon the rear arch 39. The rake 55 consists of a hub 62 formed with rake fingers 63, a stop arm 64 and a lug or projection 65. The hub 62 is arranged between the legs of a substantially U-shaped hanger 66 loosely mounted on the crank 56 and pivotally connected to the rear end of a link 67. The latter has its front end similarly connected to a bracket 68 upon the front arch 38. The stop arm 64 is held normally in engagement with a stop 69 upon the hanger 66 by means of a coil spring 70 shown in Fig. 9 of the drawings. It will be observed that when the crank shaft 57 is rotated the rake 55 will be rotated and at the same time swung axially so as to effectively engage the vines upon the rack or screen 54 and throw them outwardly to one side of the machine. Owing to the spring connection 70 the rack will yield when it engages a bunch of vines that is larger than it can move.

Having thus described my invention, what I claim as new and desire to secure by Letters Patent of the United States is:—

1. In a machine of the character described, a wheel supported frame inclined downwardly and forwardly and having side plates, a shovel at the front end of said frame, a series of flat slats arranged in parallel relation to form a rack between said side plates, said slats being formed at both of their ends with transverse alining apertures, a pivot rod passed through the apertures in the lower ends of said slats and having its ends secured in said side plates, sleeves arranged upon said rod for spacing said slats apart, a connecting rod passed through the apertures in the upper ends of said slats for uniting them for simultaneous swinging movement upon said pivot rod, spacing sleeves upon said connecting rod between said slats, means for supporting and agitating the free upper ends of said slats and an elevator to travel over the rack formed by said slats.

2. In a machine of the character described, a wheel supported frame inclined downwardly and forwardly and having side plates, a shovel at the front end of said frame, a series of flat slats arranged in parallel relation to form a rack between said side plates, said slats being formed at their upper and lower ends with transverse alining apertures, a pivot rod passed through the apertures in the lower ends of said slats and having its ends secured in said side plates, sleeves arranged upon said rod for spacing said slats apart, a connecting rod passed through the apertures in the upper ends of said slats for uniting them for simultaneous swinging movement upon said pivot rod, spacing sleeves upon said connecting rod between said slats, a transverse shaft in the upper rear portion of the frame, sprocket wheels upon said shaft, rods connecting said sprocket wheels for supporting and agitating the connected rear ends of said slats, a second transverse shaft arranged in the lower end of the frame in advance of the front ends of said slats, sprocket wheels upon said second transverse shaft, elevator chains passed over the sprocket wheels on the two shafts and arranged at opposite sides of the frame, and cross bars uniting said chains and adapted to slidably engage the upper edges of said slats, substantially as shown and described.

3. In a machine of the character described, a wheel supported frame inclined downwardly and forwardly and having side plates, a shovel at the front end of said frame, a series of flat slats arranged in parallel relation to form a rack between said side plates, said slats being formed at their upper and lower ends with transverse alining apertures, a pivot rod passed through the apertures in the lower ends of said slats and having its ends secured in said side plates, sleeves arranged upon said rod for spacing said slats apart, a connecting rod passed through the apertures in the upper ends of said slats for uniting them for simultaneous swinging movement upon said pivot rod, spacing sleeves upon said connecting rod between said slats, a transverse shaft in the upper rear portion of the frame, sprocket wheels upon said shaft, rods connecting said sprocket wheels for supporting and agitating the connected rear ends of said slats, a second transverse shaft arranged in the lower end of the frame in advance of the front ends of said slats, sprocket wheels upon said second transverse shaft, elevator chains passed over the sprocket wheels on the two shafts and arranged at opposite sides of the frame, cross bars connecting said chains and adapted to slidably engage the upper edges of said slats, a third transverse shaft arranged in said frame intermediate the first and second, sprocket wheels upon said third shaft and engaged with said chains, and agitator arms mounted upon said second and third shafts and adaped to rotate between said slats and between the bars connecting said elevator chains, said agitator arms being adapted to project above the upper edges of said slats and having curved outer ends, substantially as shown and described.

4. In a machine of the character described, a wheel supported frame inclined downwardly and forwardly, and having side plates, a shovel at the front end of said frame, a rack consisting of parallel slats arranged in said frame between said side bars, an endless elevator to travel over said rack and consisting of sprocket chains arranged adjacent to said side plates of the frame and connected by cross bars, a transverse shaft in said frame, sprocket wheels upon said shaft and engaged with said elevator chains, hubs upon the intermediate portion of said shaft having radial arms to rotate between said slats and the cross bars of said elevator, said hubs being arranged upon said shaft with their ends in contact with each other and means upon the contacting ends of said hubs for preventing them from turning with respect to each other.

5. In a machine of the character described, a wheel supported frame inclined downwardly and forwardly, and having side plates, a shovel at the front end of said frame, a rack consisting of parallel slats arranged in said frame between said side bars, an endless elevator to travel over said rack and consisting of sprocket chains arranged adjacent to said side plates of the frame and connected by cross bars, a transverse shaft in said frame, sprocket wheels upon said shaft and engaged with said elevator chains, hubs upon the intermediate portion of said shaft having radial arms to rotate between said slats and the cross bars of said elevator, said hubs being arranged upon said shaft with their ends in contact with each other and a projection upon one end of each of said hubs to enter a seat or recess in the opposing end of the next adjacent hub for the purpose specified.

6. In a machine of the character described, a wheel supported frame inclined forwardly and downwardly and comprising side plates having laterally offset lower ends to enlarge the forward end of said frame, said offset portions being flared outwardly and having longitudinally extending openings, substantially as shown and for the purposes set forth.

In testimony whereof I hereunto affix my signature in presence of two witnesses.

ERNST G. SCHREIBER.

Witnesses:
J. G. IBACH,
HENRY HAPP.